US012752386B2

(12) United States Patent
Goto et al.

(10) Patent No.: US 12,752,386 B2
(45) Date of Patent: Oct. 6, 2026

(54) CUTTING FLUID CIRCULATION DEVICE

(71) Applicant: OKUMA CORPORATION, Niwa-Gun (JP)

(72) Inventors: Yukio Goto, Niwa-Gun (JP); Satoshi Aoyama, Niwa-Gun (JP); Hikaru Arai, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 398 days.

(21) Appl. No.: 18/493,876

(22) Filed: Oct. 25, 2023

(65) Prior Publication Data

US 2024/0139895 A1 May 2, 2024

(30) Foreign Application Priority Data

Nov. 2, 2022 (JP) ................................ 2022-176668

(51) Int. Cl.
*B23Q 11/10* (2006.01)
*B23Q 11/00* (2006.01)

(52) U.S. Cl.
CPC ................................ *B23Q 11/1069* (2013.01)

(58) Field of Classification Search
CPC ............ B23Q 11/1069; B23Q 11/1076; B23Q 11/0067; B23Q 11/0057; Y02P 70/10
See application file for complete search history.

(56) References Cited

U.S. PATENT DOCUMENTS

| | | | | |
|---|---|---|---|---|
| 5,930,938 | A * | 8/1999 | De Fraties | A01K 97/11 43/15 |
| 6,196,409 | B1 * | 3/2001 | Lake | B65D 77/225 215/261 |
| 9,393,571 | B2 * | 7/2016 | Hori | B03C 1/30 |
| 10,809,015 | B2 * | 10/2020 | Yamamoto | B24B 55/03 |
| 2014/0116930 | A1 * | 5/2014 | Hori | B03C 1/30 210/167.01 |
| 2020/0078894 | A1 * | 3/2020 | Noake | B23Q 11/0067 |

FOREIGN PATENT DOCUMENTS

| | | | | |
|---|---|---|---|---|
| JP | 5930938 | B2 * | 6/2016 | B03C 1/30 |
| JP | 6196409 | B1 * | 9/2017 | B24B 55/03 |
| KR | 100688956 | B1 * | 3/2007 | B01D 21/0012 |
| KR | 20200048577 | A * | 5/2020 | B23Q 11/1069 |

* cited by examiner

*Primary Examiner* — Bayan Salone
(74) *Attorney, Agent, or Firm* — Muncy, Geissler, Olds & Lowe, P.C.

(57) ABSTRACT

A cutting fluid circulation device includes a tank reservoir, a drum filter, and a pump. The tank reservoir stores cutting fluid discharged from a machine tool. The drum filter is disposed in the tank reservoir. The drum filter performs as a primary filter that filters cutting fluid. The pump pumps up cutting fluid in the tank reservoir. An annular flow channel in which the cutting fluid filtered by the drum filter circulates is formed in the tank reservoir. A part of the cutting fluid pumped up by the pump is fed to the drum filter, used for cleaning the drum filter, and then returned to the annular flow channel, and a part of the remaining cutting fluid is fed to a secondary filter disposed outside the tank reservoir, filtered by the secondary filter, and then returned to the annular flow channel.

5 Claims, 7 Drawing Sheets

CUTTING FLUID CIRCULATION DEVICE

CROSS REFERENCE TO RELATED APPLICATION

This application claims the benefit of Japanese Patent Application Number 2022-176668 filed on Nov. 2, 2022, the entirety of which is incorporated by reference.

FIELD OF THE INVENTION

The disclosure relates to a cutting fluid circulation device that stores and filters cutting fluid discharged from a machine tool and resupply the cutting fluid to the machine tool. Note that cutting fluid is also referred to as coolant, and a cutting fluid circulation device is also referred to as a sludgeless tank.

BACKGROUND OF THE INVENTION

There has been known a cutting fluid circulation device as a device attached to a machine tool. The cutting fluid circulation device separates sludge, which is impurities such as chips, from cutting fluid supplied to a work chamber of the machine tool and discharged from the machine tool and supplies the cutting fluid after filtration again to the machine tool for reuse. The cutting fluid circulation device requires cleaning and maintenance by human hands. If the cleaning and maintenance are neglected, the cleaning effect in the work chamber cannot sufficiently be obtained, leading to breakage of the machine in the worst-case scenario.

Therefore, as an example of the cutting fluid circulation device, Japanese Patent No. 5930938 discloses a coolant system in which after coolant discharged from a machine tool to a collecting reservoir is supplied to a primary filtering device with a pump to remove chips and the like, the coolant is stored in a primary reservoir, has fine chips and the like removed by a secondary filtering device, and is returned to the machine tool. The primary reservoir has a bottomed cylindrical shape that is circular in plan view. While the coolant is rotated along the outer periphery of the primary reservoir, the coolant is pumped up by the pump disposed in a central partition member to supply it to the secondary filtering device.

Japanese Patent No. 6196409 discloses a coolant supply device in which coolant discharged from a machine tool is filtered with a drum filter and then returned to a return reservoir. The return reservoir includes first and second coolant reservoirs arranged in parallel with a predetermined space therebetween and a communicating part that allows both coolant reservoirs to communicate with one another. The return reservoir returns the coolant pumped up by a pump disposed in the second coolant reservoir to the first coolant reservoir and assists a flow of the coolant by an agitating nozzle body disposed in each coolant reservoir to suppress deposition and retention of foreign substances.

In the coolant system of Japanese Patent No. 5930938, in addition to the primary and secondary reservoirs, a reservoir is disposed for each filtering device, and pumps are needed at three positions for supplying the coolant from the primary reservoir to the primary filtering device, for supplying the coolant from the secondary reservoir to the secondary filtering device, and for supplying the coolant from the secondary filtering device to the machine tool. Accordingly, the device is complicated, leading to a cost increase.

While the coolant supply device of Japanese Patent No. 6196409 includes one return reservoir, the coolant supply device has a U-shape in plan view, and therefore, the agitating nozzle bodies are required so that the flow does not stagnate. In addition, since five pumps are disposed and each used for cleaning the drum filter, for filtering by another filter device, for forming the flow in the return reservoir, and the like, a cost increase is eventually inevitable.

Therefore, it is an object of the disclosure to provide a cutting fluid circulation device that can ensure cost reduction while maintaining collection performance of sludge with a simple configuration.

SUMMARY OF THE INVENTION

In order to achieve the above-described object, the disclosure provides a cutting fluid circulation device includes a tank reservoir, a drum filter, and a pump. The tank reservoir stores cutting fluid discharged from a machine tool. The drum filter is disposed in the tank reservoir. The drum filter performs as a primary filter that filters cutting fluid. The pump pumps up cutting fluid in the tank reservoir. An annular flow channel in which the cutting fluid filtered by the drum filter circulates is formed in the tank reservoir. A part of the cutting fluid pumped up by the pump is fed to the drum filter, used for cleaning the drum filter, and then returned to the annular flow channel, and a part of the remaining cutting fluid is fed to a secondary filter disposed outside the tank reservoir, filtered by the secondary filter, and then returned to the annular flow channel.

In another aspect of the disclosure, in the above-described configuration, an assist nozzle is disposed in the tank reservoir, and the assist nozzle ejects the cutting fluid to be returned to the annular flow channel in a direction to assist a circulation flow in the annular flow channel.

In another aspect of the disclosure, in the above-described configuration, a straightening vane is disposed in the tank reservoir, the straightening vane straightening the circulation flow in the annular flow channel.

Another aspect of the disclosure, in the above-described configuration, further includes a conveyor installed in the tank reservoir. The conveyor collects sludge from the cutting fluid discharged from the machine tool. The drum filter is installed at a lower portion of the conveyor. The annular flow channel is formed around the conveyor.

Another aspect of the disclosure, in the above-described configuration, further includes a second tank reservoir installed adjacently to the tank reservoir. The cutting fluid filtered by the secondary filter is selectively suppliable via a return flow channel switching unit to any one of a first return flow channel and a second return flow channel. The first return flow channel causes the cutting fluid to return to the annular flow channel. The second return flow channel causes the cutting fluid to return to the second tank reservoir after filtration by a tertiary filter.

With the disclosure, by activating only one pumping-up pump in a simple annular flow channel, cleaning of the drum filter and filtration by the secondary filter can be simultaneously performed. Accordingly, the simple configuration can ensure cost reduction while maintaining collection performance of sludge by the drum filter and the secondary filter.

According to another aspect of the disclosure, the assist nozzle that ejects the cutting fluid to be returned to the annular flow channel in a direction to assist the circulation flow in the annular flow channel is disposed in the tank reservoir. Therefore, in addition to the above effects, the circulation flow in the annular flow channel is assisted, thereby allowing more effective avoidance of retention and accumulation of sludge inside the tank reservoir.

According to another aspect of the disclosure, the straightening vane that straightens the circulation flow in the annular flow channel is disposed in the tank reservoir. Therefore, in addition to the above effects, the smooth circulation flow in the annular flow channel can be maintained, leading to more effective avoidance of retention and accumulation of sludge.

According to another aspect of the disclosure, the conveyor that collects sludge from the cutting fluid discharged from the machine tool is installed in the tank reservoir, the drum filter is installed at the lower portion of the conveyor, and the annular flow channel is formed around the conveyor. Therefore, in addition to the above effects, the annular flow channel centering around the conveyor can easily be formed, allowing the cutting fluid to circulate in the entire tank reservoir.

According to another aspect of the disclosure, the cutting fluid filtered by the secondary filter is selectively suppliable via the return flow channel switching unit to any one of the first return flow channel causing the cutting fluid to return to the annular flow channel and the second return flow channel causing the cutting fluid to return to the second tank reservoir after filtration by the tertiary filter. Therefore, in addition to the above effects, by returning the cutting fluid to the annular flow channel when it is not supplied to a spindle, maintenance of the tertiary filter is required less frequently, leading to prolonged service life of the tertiary filter. On the other hand, by further filtering the cutting fluid by the tertiary filter when the cutting fluid is supplied to the spindle, prolonged service life of a spindle rotary joint unit can be expected.

DETAILED DESCRIPTION OF THE INVENTION

The following describes embodiments of the disclosure based on the drawings.

Embodiment 1 of the disclosure is described below.

Figure 1:
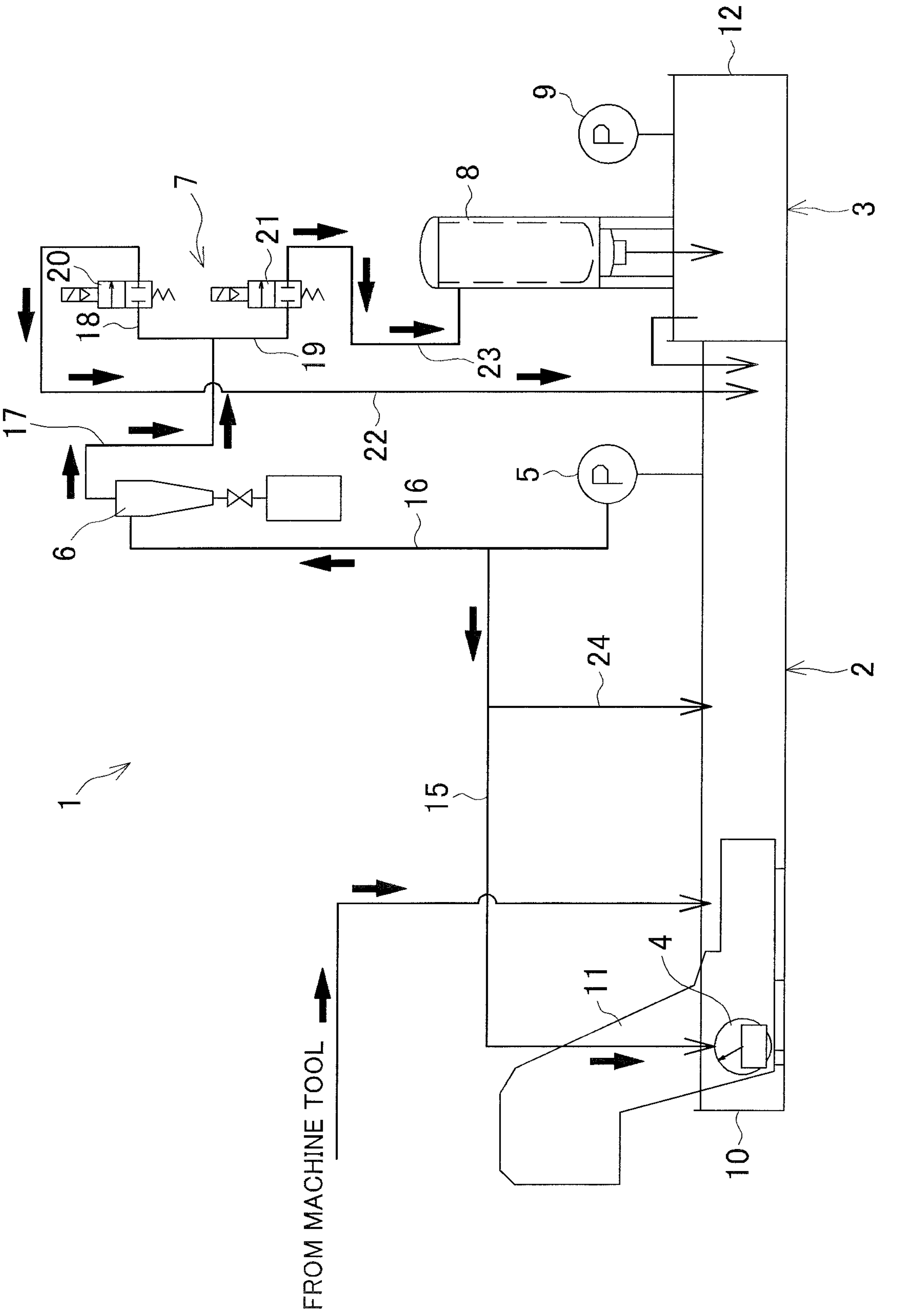
FIG. 1 is a schematic diagram of a cutting fluid circulation device of Embodiment 1.

FIG. 1 is a schematic diagram illustrating an exemplary cutting fluid circulation device. A cutting fluid circulation device 1 includes a first tank reservoir 2, a second tank reservoir 3, a drum filter 4 as a primary filter, a pumping-up pump 5, a secondary filter 6, a pipe switching unit 7, a tertiary filter 8, and a through pump 9.

The first tank reservoir 2 is a bottomed reservoir having a circumference surrounded by an outer wall 10. A conveyor 11 is installed in the first tank reservoir 2. Cutting fluid used in a machine tool and including sludge, such as chips, is discharged to the conveyor 11.

The second tank reservoir 3, which is installed adjacently to the first tank reservoir 2, is a bottomed reservoir having a circumference surrounded by an outer wall 12. However, the second tank reservoir 3 is formed to have an area in plan view smaller than that of the first tank reservoir 2. The outer wall 12 of the second tank reservoir 3 is formed to be higher than the outer wall 10 of the first tank reservoir 2. Cutting fluid overflowing from the second tank reservoir 3 flows into the first tank reservoir 2.

The drum filter 4 is installed at a lower portion in the conveyor 11. The drum filter 4 filters cutting fluid at a filter portion on an outer peripheral surface to remove pieces of sludge larger than a predetermined size. The cutting fluid after the filtration is discharged from both ends in an axial direction of the drum filter 4 into the first tank reservoir 2.

The pumping-up pump 5 is disposed in the first tank reservoir 2 and connected to a cleaning nozzle, which is not illustrated, in the drum filter 4 via a first pipe 15. Accordingly, the cutting fluid pumped up by the pumping-up pump 5 is ejected from inside of the drum filter 4 from the cleaning nozzle to an outer peripheral surface of the drum filter 4 to clean the drum filter 4.

The first pipe 15 includes a second pipe 16 branched in its course. The second pipe 16 is connected to the secondary filter 6.

The secondary filter 6 is a cyclone filter installed outside the first tank reservoir 2 and the second tank reservoir 3. The secondary filter 6 is connected to the pipe switching unit 7 via a third pipe 17. The cutting fluid from which sludge is removed by the secondary filter 6 is fed to the pipe switching unit 7.

The pipe switching unit 7 includes a first branch pipe 18 and a second branch pipe 19 that are branched into two ways, a first valve 20 disposed on the first branch pipe 18, and a second valve 21 disposed on the second branch pipe 19. The first branch pipe 18 is connected to the first tank reservoir 2 via a fourth pipe 22. The second branch pipe 19 is connected to the tertiary filter 8 via a fifth pipe 23.

The tertiary filter 8 is a bag filter installed outside the first and second tank reservoirs 2 and 3. The cutting fluid filtered by the tertiary filter 8 is fed into the second tank reservoir 3.

The through pump 9 is installed in the second tank reservoir 3. The through pump 9 supplies the cutting fluid in the second tank reservoir 3 to a spindle of the machine tool.

Figure 2:
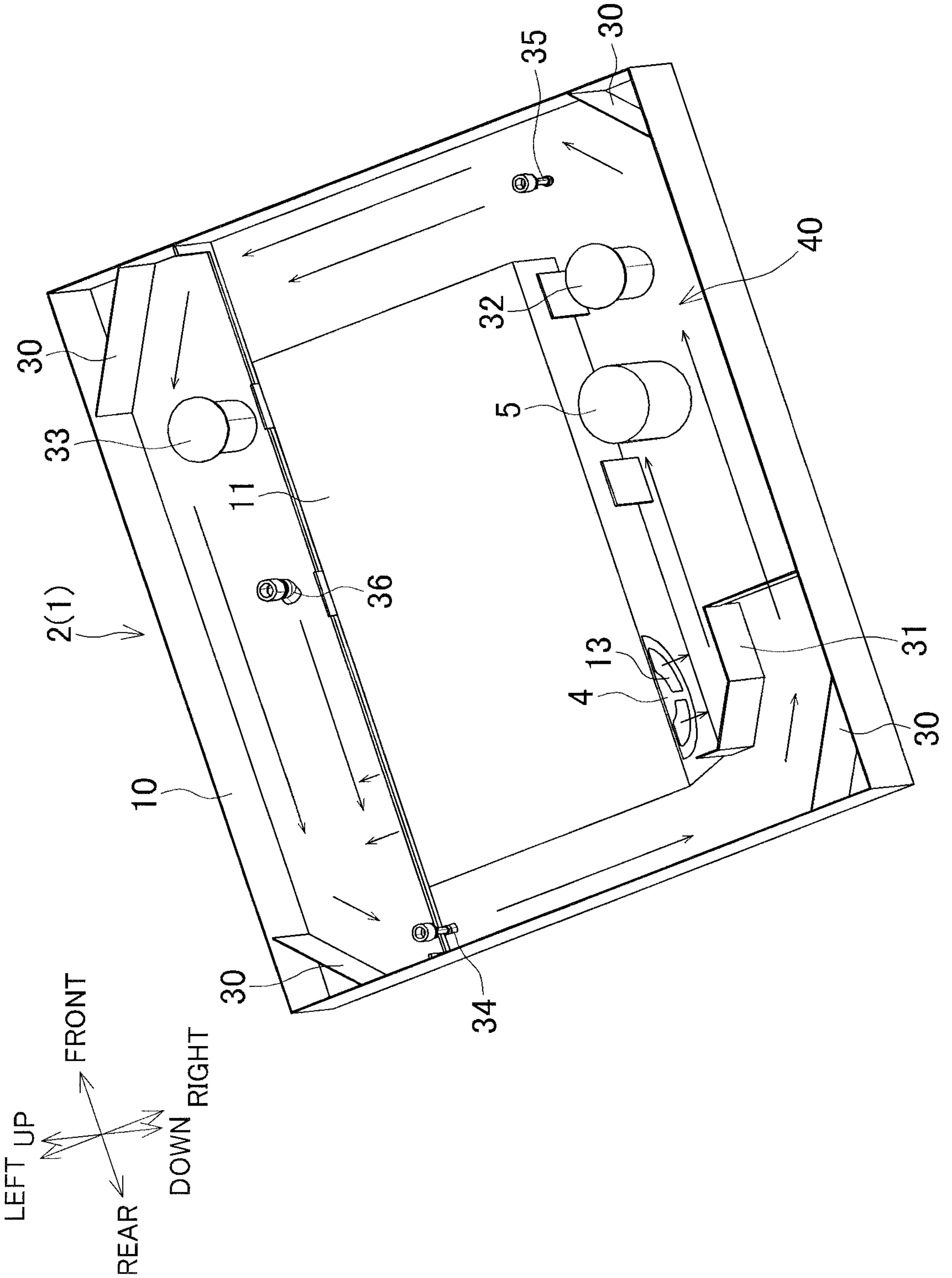
FIG. 2 is a perspective view of a first tank reservoir of Embodiment 1.
Figure 3:
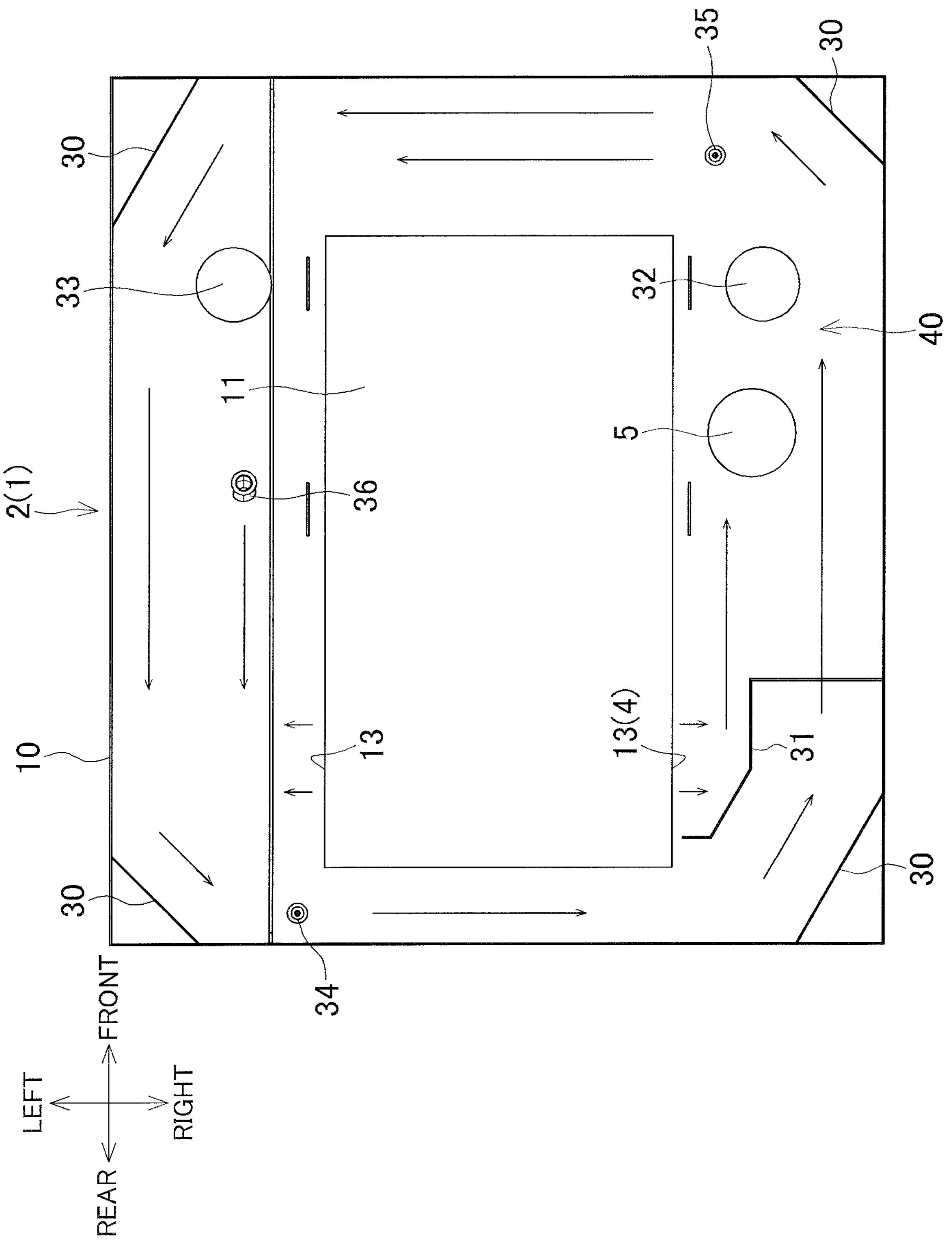
FIG. 3 is a plan view of the first tank reservoir of Embodiment 1.

FIG. 2 and FIG. 3 illustrate details of the first tank reservoir 2. Here, the first tank reservoir 2 has a quadrangular shape in plan view. In FIG. 2 and FIG. 3, front to rear and right to left directions are defined using the right side in FIG. 3 as the front for convenience. A longitudinal direction of the first tank reservoir 2 is the front-rear direction.

The first tank reservoir 2 has respective corner portions in which corner portion straightening vanes 30, 30 inclined in a style of chamfering inner shape corner portions are disposed. The conveyor 11 is arranged approximately at the center in the first tank reservoir 2 and in the front-rear direction parallel to the longitudinal direction of the first tank reservoir 2. Note that an upper portion of the conveyor 11 is omitted in FIGS. 2 and 3.

Accordingly, in the first tank reservoir 2, an annular flow channel 40 circulating outside the conveyor 11 is formed between the outer wall 10 with the corner portion straightening vanes 30; and the conveyor 11. The drum filter 4 is arranged at a rear portion of the conveyor 11 and includes outlets 13, 13 for filtered cutting fluid disposed at its right and left to allow the drum filter 4 to communicate with the annular flow channel 40.

A straightening vane 31 is disposed on the right side of the rear portion of the conveyor 11 and in the first tank reservoir 2. The straightening vane 31 extends to the right side from the rear of the outlet 13 on the right side, then inclines obliquely toward the right front, and extends forward on the right side of the outlet 13. The straightening vane 31 allows the cutting fluid discharged from the outlet 13 on the right side to change direction and be biased forward.

The pumping-up pump 5 is arranged at the front of the straightening vane 31 and on the right side of the conveyor 11. A first pump 32 is arranged at the front of the pumping-up pump 5 and on the right side of the conveyor 11, and a second pump 33 is arranged on an opposite side of the first pump 32 across the conveyor 11. The first pump 32 and the second pump 33 pump up the cutting fluid in the first tank reservoir 2 and supply the cutting fluid to a work chamber of the machine tool via pipes that are not illustrated.

Three first to third assist nozzles 34 to 36 are disposed in the first tank reservoir 2. The first assist nozzle 34 and the second assist nozzle 35 are connected to two respective sixth pipes 24, 24, only one of which is illustrated in FIG. 1, branched from the first pipe 15. The third assist nozzle 36 is connected to the fourth pipe 22. The first assist nozzle 34 is arranged on the left side of the flow channel on the rear side of the conveyor 11 and ejects the cutting fluid toward the right side. The second assist nozzle 35 is arranged on the right side of the flow channel on the front side of the conveyor 11 and ejects the cutting fluid toward the left side. The third assist nozzle 36 is arranged approximately at the center of the flow channel on the left side of the conveyor 11 and ejects the cutting fluid toward the rear side.

In the cutting fluid circulation device 1 configured as described above, the cutting fluid collected from the machine tool by the conveyor 11 passes through the drum filter 4 to be filtered and then is discharged to the annular flow channel 40 from the right and left outlets 13, 13. Since the straightening vane 31 is disposed on the right side of the drum filter 4, the cutting fluid discharged from the outlet 13 on the right side is biased forward by the straightening vane 31. Accordingly, as illustrated by solid arrows in FIGS. 2 and 3, a circulation flow, that is, swirl flow, that allows the cutting fluid to flow counterclockwise in the annular flow channel 40 is generated in the first tank reservoir 2.

Then, when the pumping-up pump 5 is activated, the cutting fluid in the annular flow channel 40 is pumped up and supplied to the first pipe 15 and the second pipe 16.

The cutting fluid flowing through the first pipe 15 is ejected inside the drum filter 4 from the cleaning nozzle to clean the drum filter 4 and then returned to the annular flow channel 40. Meanwhile, a part of the cutting fluid branched to each sixth pipe 24 is ejected in a flow direction in the annular flow channel 40 from the first and second assist nozzles 34 and 35. Accordingly, the flow in the annular flow channel 40 is assisted.

The cutting fluid flowing through the second pipe 16 is filtered by the secondary filter 6 and fed to the third pipe 17. At this time, when the cutting fluid is not ejected from a tool mounted to the spindle in the machine tool, the first valve 20 is turned ON, that is, the valve is opened, and the second valve 21 is turned OFF, that is, the valve is closed, in the pipe switching unit 7. Accordingly, the cutting fluid supplied from the third pipe 17 passes through the first branch pipe 18, travels through the fourth pipe 22, and is returned from the third assist nozzle 36 to the annular flow channel 40. The cutting fluid ejected from the third assist nozzle 36 biases the flow at a left portion of the annular flow channel 40 to the rear side. Accordingly, the circulation flow in the annular flow channel 40 is assisted.

By thus activating the pumping-up pump 5, the cutting fluid is fed to each of the drum filter 4 and the secondary filter 6 to simultaneously perform cleaning of the drum filter 4 and filtration by the secondary filter 6, and the circulation flow in the annular flow channel 40 is maintained. Accordingly, the flow in one direction can be formed while keeping a flow rate at a certain level or more, allowing avoidance of retention and accumulation of sludge inside the first tank reservoir 2.

When machining is performed with the machine tool, the first and second pumps 32 and 33 are activated to pump up the cutting fluid in the first tank reservoir 2 and supply the cutting fluid into the work chamber. At this time, when the cutting fluid is ejected from the tool mounted to the spindle in the machine tool, the first valve 20 is turned OFF, that is, the valve is closed, and the second valve 21 is turned ON, that is, the valve is opened, in the pipe switching unit 7. Accordingly, the cutting fluid supplied from the third pipe 17 passes through the second branch pipe 19, travels through the fifth pipe 23, and is fed to the tertiary filter 8. The cutting fluid further filtered by the tertiary filter 8 is discharged into the second tank reservoir 3 and pumped up by the through pump 9 to be fed to the spindle.

Thus, the cutting fluid circulation device 1 of Embodiment 1 described above includes the first tank reservoir 2 as one example of a tank reservoir, the drum filter 4, and the pumping-up pump 5 as one example of a pump. The first tank reservoir 2 stores cutting fluid discharged from a machine tool. The drum filter 4 is disposed in the first tank reservoir 2 and filters the cutting fluid. The pumping-up pump 5 pumps up the cutting fluid in the first tank reservoir 2. In the first tank reservoir 2, the annular flow channel 40 in which the cutting fluid filtered by the drum filter 4 circulates is formed.

Then, a part of the cutting fluid pumped up from the pumping-up pump 5 is fed to the drum filter 4, used for cleaning the drum filter 4, and then returned to the annular flow channel 40. Meanwhile, a part of the remaining cutting fluid is fed to the secondary filter 6 disposed outside the first tank reservoir 2, filtered by the secondary filter 6, and then returned to the annular flow channel 40.

With the configuration, by activating only one pumping-up pump 5 in the simple annular flow channel 40, cleaning of the drum filter 4 and filtration by the secondary filter 6 can be simultaneously performed. Accordingly, the simple configuration can ensure cost reduction while maintaining collection performance of sludge by the drum filter 4 and the secondary filter 6.

The first to third assist nozzles 34 to 36 as one example of an assist nozzle are disposed in the first tank reservoir 2. The first to third assist nozzles 34 to 36 eject the cutting fluid returned to the annular flow channel 40 in a direction to assist the circulation flow in the annular flow channel 40.

Accordingly, the circulation flow in the annular flow channel 40 is assisted, allowing more effective avoidance of retention and accumulation of sludge inside the first tank reservoir 2.

The corner portion straightening vanes 30 and the straightening vane 31, each of which is one example of a straightening vane, are disposed in the first tank reservoir 2. The corner portion straightening vanes 30 and the straightening vane 31 straighten the circulation flow in the annular flow channel 40.

Accordingly, the smooth circulation flow can be maintained in the annular flow channel 40, leading to more effective avoidance of retention and accumulation of sludge.

In the first tank reservoir 2, the conveyor 11 that collects sludge from the cutting fluid discharged from the machine tool is installed, the drum filter 4 is installed at the lower portion of the conveyor 11, and the annular flow channel 40 is formed around the conveyor 11.

Accordingly, the annular flow channel 40 centering around the conveyor 11 can be easily formed, allowing the cutting fluid to circulate in the entire first tank reservoir 2.

The second tank reservoir 3 as one example of a second tank reservoir is installed adjacently to the first tank reservoir 2. The cutting fluid filtered by the secondary filter 6 is selectively suppliable via the pipe switching unit 7 as one example of a return flow channel switching unit to any one of the fourth pipe 22 as one example of a first return flow channel and the fifth pipe 23 as one example of a second return flow channel. The fourth pipe 22 causes the cutting fluid to return to the annular flow channel 40. The fifth pipe 23 causes the cutting fluid to return to the second tank reservoir 3 after filtration by the tertiary filter 8.

Accordingly, by returning the cutting fluid from the fourth pipe 22 to the annular flow channel 40 when it is not supplied to a spindle, maintenance of the tertiary filter 8 is required less frequently, leading to prolonged service life of the tertiary filter 8. On the other hand, by further filtering the cutting fluid by the tertiary filter 8 when the cutting fluid is supplied to the spindle, prolonged service life of a spindle rotary joint unit can be expected.

In Embodiment 1, the position of the pumping-up pump can be changed as necessary. The number and positions of the pumps other than the pumping-up pump can also be changed as necessary.

The number and positions of the assist nozzles and the pipes connected to the assist nozzles can also be changed as necessary. A plurality of assist nozzles may be arranged alongside of one another in a width direction of the flow channel. However, the assist nozzles may be omitted as long as the circulation flow in the annular flow channel is possible.

The shape in plan view of the first tank reservoir may also be changed as necessary. The shape in plan view may be a rectangular shape with the right-left direction being longitudinal instead of the front-rear direction or may be a square shape, polygonal shape, circular shape, or the like.

The straightening vane may be disposed at the outlet on the left side of the primary filter instead of the outlet on the right side or may be disposed at both left and right sides. The shape and position of the straightening vane itself can be changed as necessary.

The following describes other Embodiments 2 and 3 of the first tank reservoir based on FIG. 4 to FIG. 7. However, the same parts as those of Embodiment 1 are denoted by the same reference numerals, and overlapped description will be omitted. In Embodiments 2 and 3, front to rear and right to left directions are defined using the right side in FIG. 5 and FIG. 7 as the front for convenience.

Embodiment 2 of the disclosure is described below.

Figure 4:
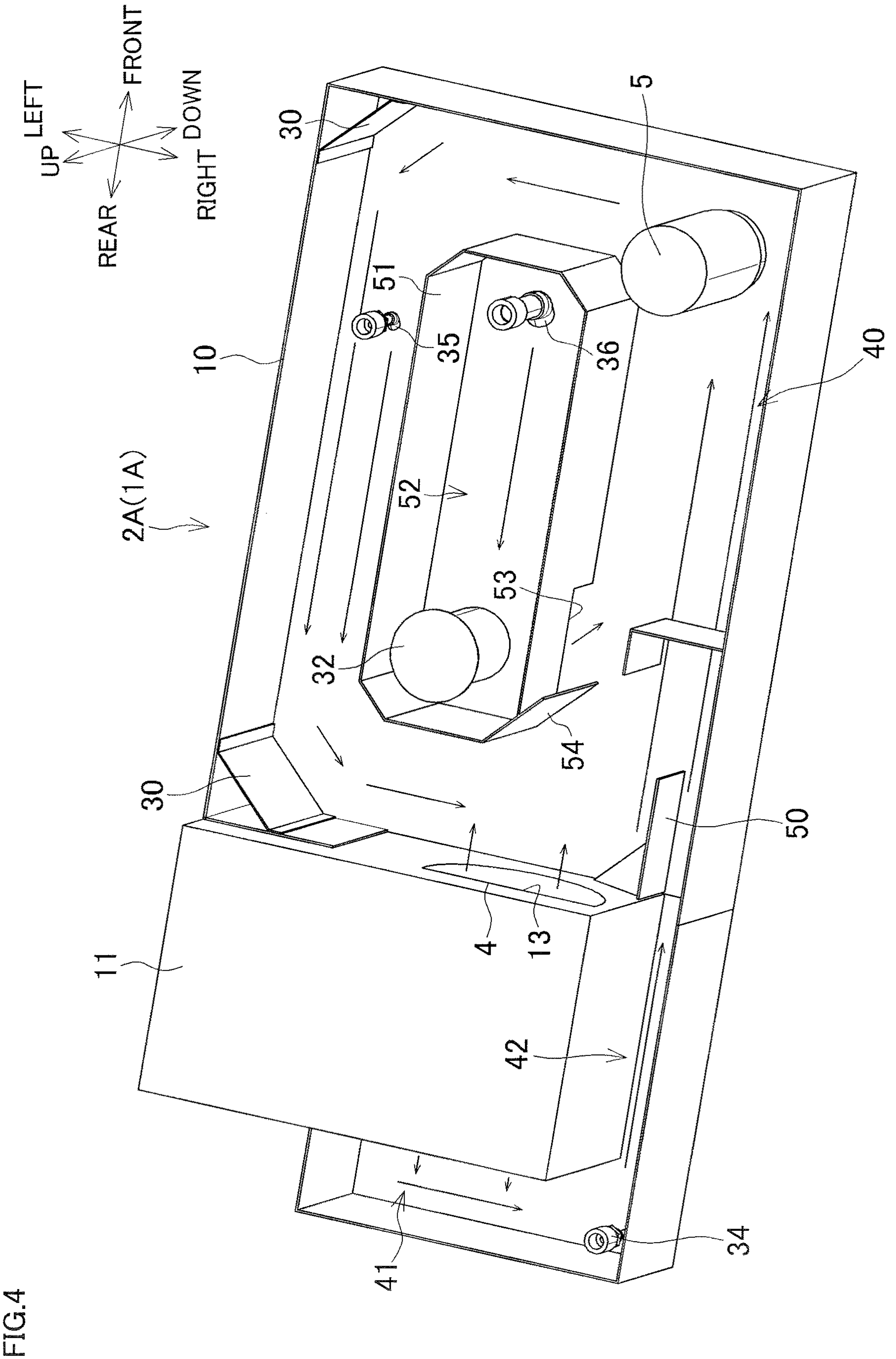
FIG. 4 is a perspective view of a first tank reservoir of Embodiment 2.
Figure 5:
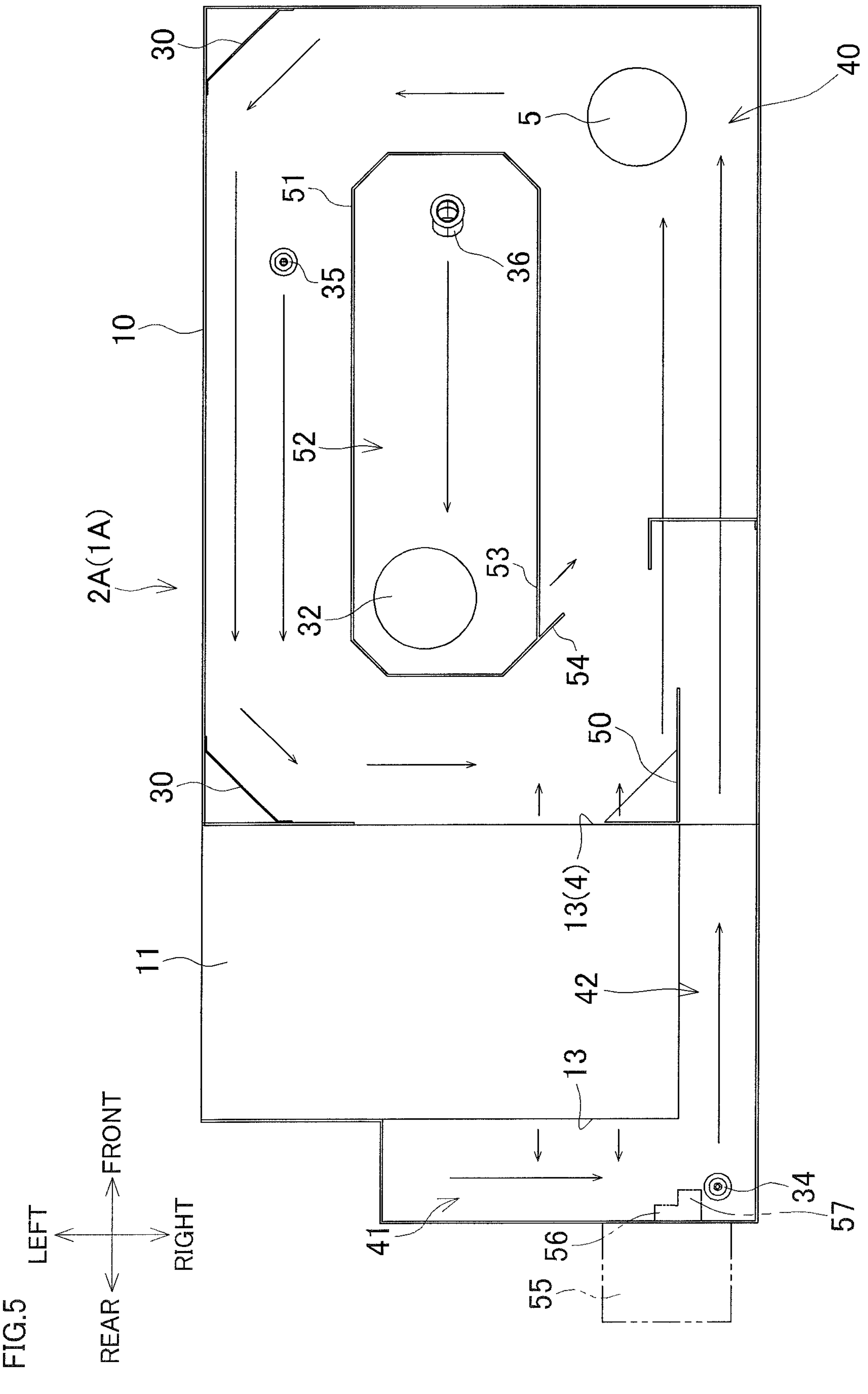
FIG. 5 is a plan view of the first tank reservoir of Embodiment 2.

A first tank reservoir 2A of a cutting fluid circulation device 1A illustrated in FIG. 4 and FIG. 5 has a vertically elongate rectangular shape having a length in the front-rear direction longer than the length in the right-left direction, and the conveyor 11 is disposed on the rear side of the first tank reservoir 2A. A rear side flow channel 41 extending in the right-left direction is formed on the rear side of the conveyor 11. A right side flow channel 42 communicated with a right end of the rear side flow channel 41 and extending in the front-rear direction is formed on the right side of the conveyor 11. The annular flow channel 40 in a vertically elongate rectangular shape in plan view is formed on the front side of the conveyor 11 and in the first tank reservoir 2A. The right side flow channel 42 is joined to the annular flow channel 40.

In the first tank reservoir 2A, the corner portion straightening vanes 30, 30 are disposed at the front and rear on the left side of the annular flow channel 40. The drum filter 4 includes the outlets 13, 13 that allow the drum filter 4 to communicate with the rear side flow channel 41 and the annular flow channel 40 and discharge filtered cutting fluid. A right side straightening vane 50 is disposed on the rear side of the annular flow channel 40. The right side straightening vane 50 extends forward in a straight line from between the right side flow channel 42 and the outlet 13 on the front side of the drum filter 4.

An inner side straightening vane 51 is disposed at the center of the annular flow channel 40. The inner side straightening vane 51 is formed into a vertically elongate rectangular shape in plan view that is one size smaller than the front side of the first tank reservoir 2A, and has four corners chamfered. A space surrounded by the inner side straightening vane 51 is a quasi-clean reservoir 52 partitioned from the annular flow channel 40. However, a communication port 53 communicated with the annular flow channel 40 is cut out and formed at a lower end on the right side of a rear portion of the inner side straightening vane 51. An extending plate 54 projecting in an inclined manner from a rear end of the communication port 53 toward the front right side is foil ted at the chamfering portion on the right side of the rear portion of the inner side straightening vane 51 adjacent to the communication port 53.

The pumping-up pump 5 is arranged at a corner portion on the right side of a front portion of the annular flow channel 40. The first pump 32 is arranged on the rear side in the quasi-clean reservoir 52.

The first assist nozzle 34 is arranged toward the front side at a communicating portion between the rear side flow channel 41 and the right side flow channel 42. The second assist nozzle 35 is arranged toward the rear side on the left side of the front portion of the annular flow channel 40. The third assist nozzle 36 is arranged toward the rear side on the front side in the quasi-clean reservoir 52.

As illustrated by a two-dot chain line in FIG. 5, a temperature regulator 55 is disposed outside the first tank reservoir 2A and at the proximity of the communicating portion between the rear side flow channel 41 and the right side flow channel 42. The temperature regulator 55 suctions cutting fluid from a suction opening 56 disposed in the communicating portion to adjust the temperature of the cutting fluid to a predetermined temperature and then delivers the cutting fluid from a delivery opening 57. A delivery direction from the delivery opening 57 is facing forward similarly to the first assist nozzle 34.

In the cutting fluid circulation device 1A configured as described above, the cuffing fluid collected from the machine tool by the conveyor 11 passes through the drum filter 4 to be filtered and then is discharged to the rear side flow channel 41 and the annular flow channel 40 from the front and rear outlets 13, 13. The cutting fluid discharged from the outlet 13 on the rear side flows to the right side flow channel 42 and flows facing forward into a right portion of the annular flow channel 40 by the right side straightening vane 50. The cutting fluid discharged from the outlet 13 on the front side flows facing forward into the right portion of the annular flow channel 40 by the right side straightening vane 50 and the extending plate 54 of the inner side straightening vane 51. Accordingly, as illustrated by solid arrows in FIGS. 4 and 5, a circulation flow that allows the cutting fluid to flow counterclockwise in the annular flow channel 40 is generated in the first tank reservoir 2A.

Then, when the pumping-up pump 5 is activated, the cutting fluid in the annular flow channel 40 is pumped up and supplied to the first pipe 15 and the second pipe 16.

The cutting fluid flowing through the first pipe 15 is ejected inside the drum filter 4 from the cleaning nozzle to clean the drum filter 4 and then returned to the rear side flow channel 41 and the annular flow channel 40 from the front and rear outlets 13, 13.

Additionally, a part of the cutting fluid branched from the first pipe 15 to each sixth pipe 24 is ejected from the first and second assist nozzles 34 and 35 into the first tank reservoir 2A. The cutting fluid ejected from the first assist nozzle 34 biases the flow in the right side flow channel 42 to the front side. The cutting fluid delivered from the delivery opening 57 of the temperature regulator 55 also biases the flow in the right side flow channel 42 to the front side. The cutting fluid ejected from the second assist nozzle 35 biases the flow at a left portion of the annular flow channel 40 to the rear side. Accordingly, the circulation flow in the annular flow channel 40 is assisted.

Meanwhile, the cutting fluid flowing through the second pipe 16 is further filtered by the secondary filter 6 and fed to the third pipe 17. At this time, when the cutting fluid is not ejected from a tool mounted to a spindle in the machine tool, the first valve 20 is turned ON, that is, the valve is opened, and the second valve 21 is turned OFF, that is, the valve is closed, in the pipe switching unit 7. Accordingly, the cutting fluid supplied from the third pipe 17 passes through the first branch pipe 18, travels through the fourth pipe 22, and is returned from the third assist nozzle 36 to the first tank reservoir 2A. The cutting fluid ejected from the third assist nozzle 36 biases the cutting fluid in the quasi-clean reservoir 52 to the rear side. Accordingly, the cutting fluid in the quasi-clean reservoir 52 flows from the communication port 53 along the extending plate 54 into the right portion of the annular flow channel 40 to assist the circulation flow in the annular flow channel 40.

By thus activating the pumping-up pump 5, the cutting fluid is fed to each of the drum filter 4 and the secondary filter 6 to simultaneously perform cleaning of the drum filter 4 and filtration by the secondary filter 6, and the circulation flow in the annular flow channel 40 is maintained. Accordingly, the flow in one direction can be formed while keeping a flow rate at a certain level or more, allowing avoidance of retention and accumulation of sludge inside the first tank reservoir 2A.

When machining is performed with the machine tool, the first pump 32 is activated to pump up the cutting fluid in the quasi-clean reservoir 52 and supply the cutting fluid into a work chamber. At this time, when the cutting fluid is ejected from the tool mounted to the spindle in the machine tool, the first valve 20 is turned OFF, that is, the valve is closed, and the second valve 21 is turned ON, that is, the valve is opened, in the pipe switching unit 7. Accordingly, the cutting fluid supplied from the third pipe 17 passes through the second branch pipe 19, travels through the fifth pipe 23, and is fed to the tertiary filter 8. The cutting fluid further filtered by the tertiary filter 8 is discharged into the second tank reservoir 3 and pumped up by the through pump 9 to be fed to the spindle. The cutting fluid overflowing from the second tank reservoir 3 crosses over the outer wall 12 and flows into the adjacent first tank reservoir 2A.

Thus, the cutting fluid circulation device 1A of Embodiment 2 described above also includes the first tank reservoir 2A as one example of a tank reservoir, the drum filter 4, and the pumping-up pump 5 as one example of a pump. The first tank reservoir 2A stores cutting fluid discharged from a machine tool. The drum filter 4 is disposed in the first tank reservoir 2A and filters the cutting fluid. The pumping-up pump 5 pumps up the cutting fluid in the first tank reservoir 2A. In the first tank reservoir 2A, the annular flow channel 40 in which the cutting fluid filtered by the drum filter 4 circulates is formed.

Then, a part of the cutting fluid pumped up from the pumping-up pump 5 is fed to the drum filter 4, used for cleaning the drum filter 4, and then returned to the annular flow channel 40. Meanwhile, the part of the remaining cutting fluid is fed to the secondary filter 6 disposed outside the first tank reservoir 2A, filtered by the secondary filter 6, and then returned to the annular flow channel 40.

With the configuration, by activating only one pumping-up pump 5 in the simple annular flow channel 40, cleaning of the drum filter 4 and filtration by the secondary filter 6 can be simultaneously performed. Accordingly, the simple configuration can ensure cost reduction while maintaining collection performance of sludge by the drum filter 4 and the secondary filter 6, and similar effects to those of the cutting fluid circulation device 1 of Embodiment 1 can be obtained.

In Embodiment 2, the position of the pumping-up pump can be changed as necessary. The number and positions of the pumps other than the pumping-up pump can also be changed as necessary. For example, a second pump may be arranged in the annular flow channel or the quasi-clean reservoir.

The number and positions of the assist nozzles and the pipes connected to the assist nozzles can also be changed as necessary. A plurality of assist nozzles may be arranged alongside of one another in a width direction of the flow channel. However, the assist nozzles may be omitted as long as the circulation flow in the annular flow channel is possible.

The shape in plan view of the first tank reservoir may also be changed as necessary. The shape in plan view may be a rectangular shape with the right-left direction being longitudinal instead of the front-rear direction. The shape in plan view of the quasi-clean reservoir can also be changed to fit the shape in plan view of the first tank reservoir. The communication port with the annular flow channel may be provided at a different position from the above embodiment.

The conveyor may be arranged on the front side of the first tank reservoir instead of the rear side.

The shape and position of the right side straightening vane can be changed as necessary. The right side straightening vane may be omitted as long as the circulation flow in the annular flow channel is possible.

Embodiment 3 of the disclosure is described below.

Figure 6:
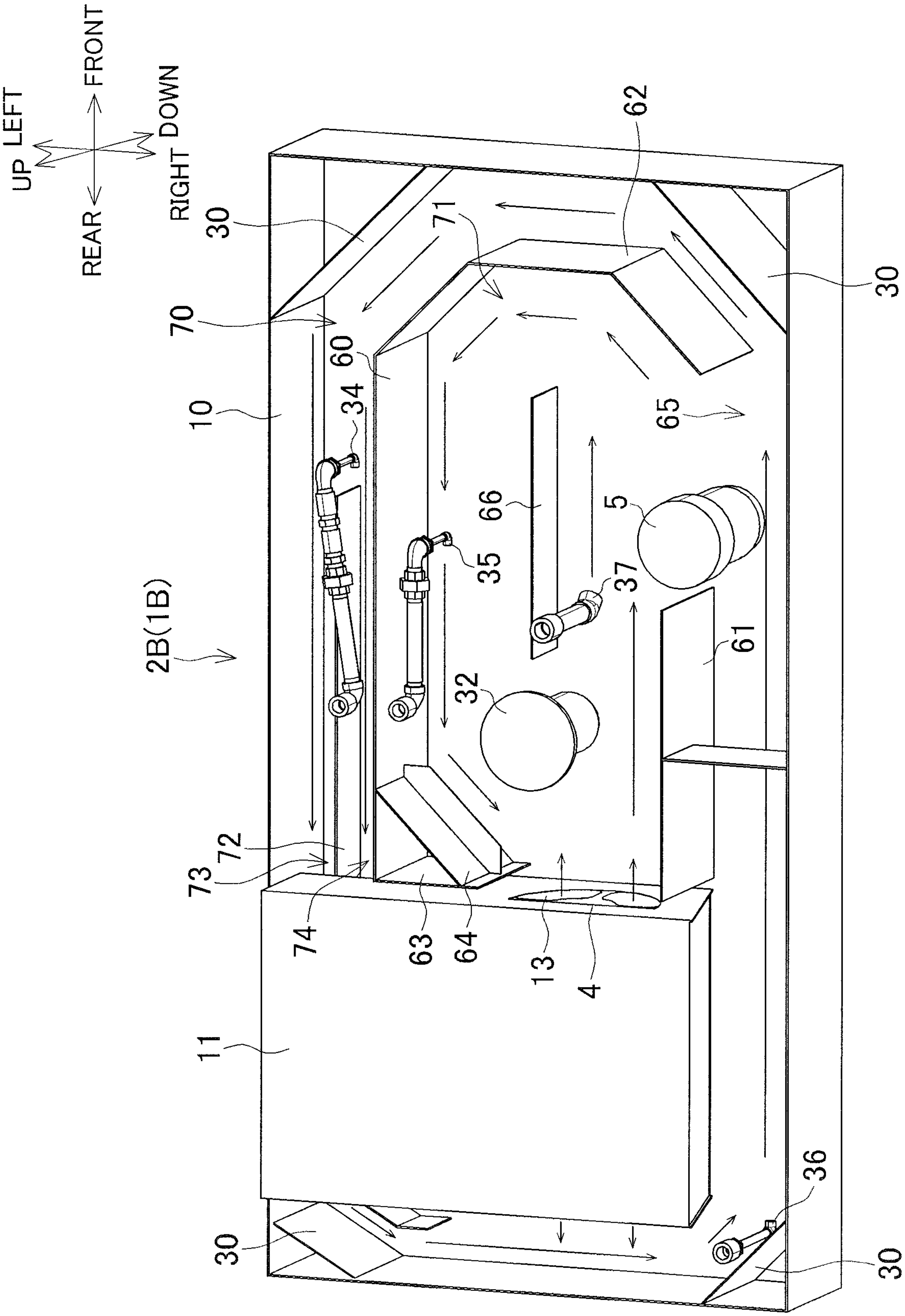
FIG. 6 is a perspective view of a first tank reservoir of Embodiment 3.
Figure 7:
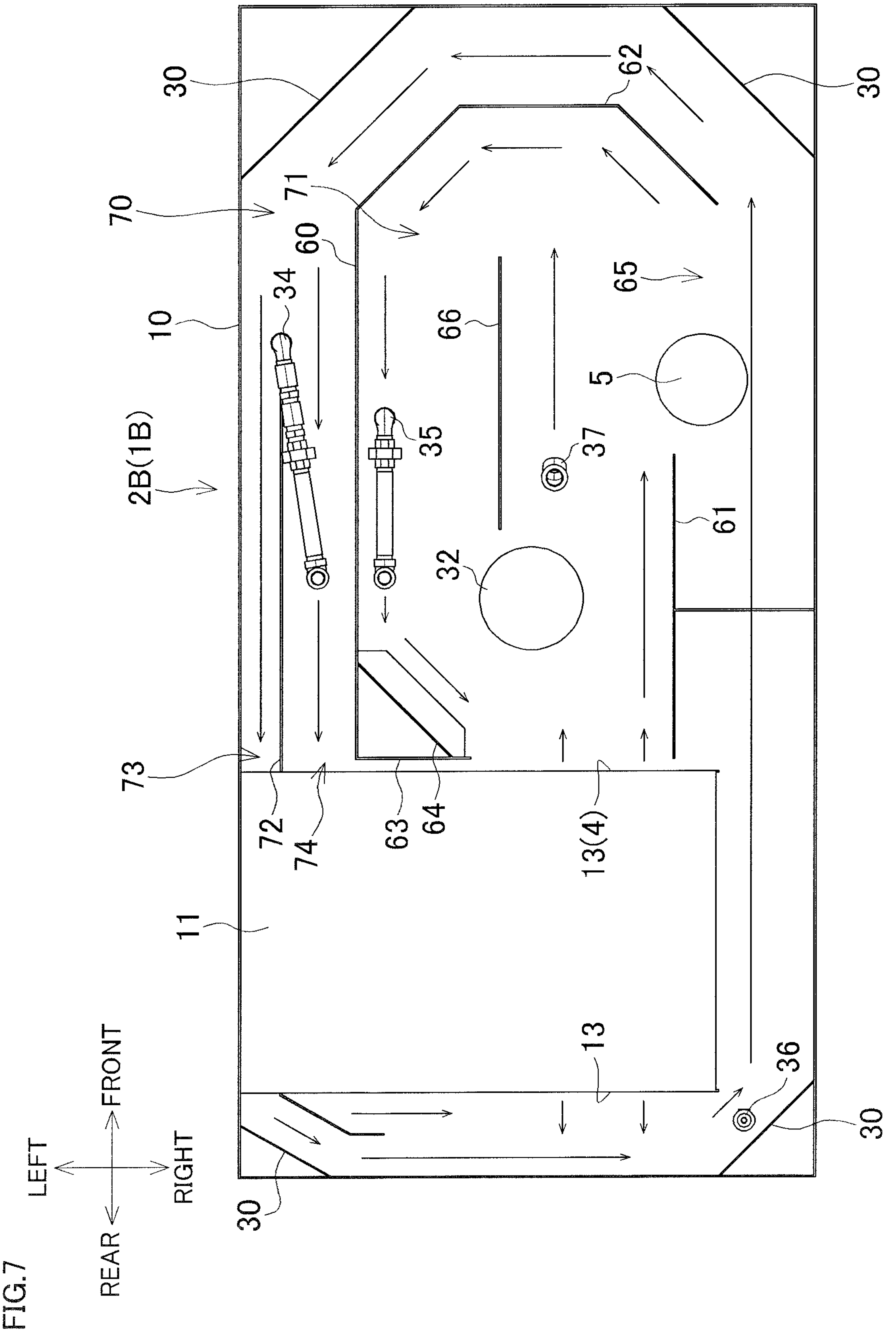
FIG. 7 is a plan view of the first tank reservoir of Embodiment 3.

A first tank reservoir 2B of a cutting fluid circulation device 1B illustrated in FIG. 6 and FIG. 7 also has a rectangular shape in plan view, which is long in the front-rear direction, and the conveyor 11 is arranged to be biased to the rear of the first tank reservoir 2B.

A left side straightening vane 60 and a right side straightening vane 61 that extend in the front-rear direction are disposed at the front of the conveyor 11 and inside the outer wall 10. The left side straightening vane 60 inclines in parallel with the corner portion straightening vane 30 on an inner side of the corner portion straightening vane 30 on the left side of a front portion of the first tank reservoir 2B and is joined to a front side straightening vane 62 parallel to the outer wall 10 on the front side of the first tank reservoir 2B. The front side straightening vane 62 has a right end that inclines in parallel with the corner portion straightening vane 30 on the inner side of the corner portion straightening vane 30 on the right side of the front portion of the first tank reservoir 2B. The left side straightening vane 60 has a rear end portion joined to a partition plate 63 in the right-left direction that partitions a boundary with the conveyor 11 excluding the outlet 13 on the front side of the drum filter 4. An inclined straightening vane 64 is disposed at a corner portion formed by the partition plate 63 and the left side straightening vane 60.

The right side straightening vane 61 extends in parallel with the left side straightening vane 60. The right side straightening vane 61 has a front end portion interrupted on a near side with respect to the inclined portion of the front side straightening vane 62 to form a communication port 65 between the right side straightening vane 61 and the front side straightening vane 62.

A center plate 66 extending in the front-rear direction on the front side with respect to the outlet 13 of the drum filter 4 is arranged between the left side straightening vane 60 and the right side straightening vane 61. Both front and rear ends of the center plate 66 are away from both the partition plate 63 and the front side straightening vane 62.

Accordingly, in the first tank reservoir 2B, an outside annular flow channel 70 and an inside annular flow channel 71 are formed. The outside annular flow channel 70 circulates around the conveyor 11, the left side straightening vane 60, the right side straightening vane 61, and the front side straightening vane 62. The inside annular flow channel 71 circulates on the inner side of the left side straightening vane 60, the right side straightening vane 61, and the front side straightening vane 62 centering around the center plate 66. The outside annular flow channel 70 is communicated with the inside annular flow channel 71 via the communication port 65.

A division straightening vane 72 that divides a flow channel width into right and left is disposed in the front-rear direction at a left portion of the outside annular flow channel 70. The division straightening vane 72 has a rear end that inclines along the corner portion straightening vane 30 on the inner side of the corner portion straightening vane 30. The division straightening vane 72 divides the left portion of the outside annular flow channel 70 into an outer divided flow channel 73 and an inner divided flow channel 74.

The pumping-up pump 5 is arranged to be biased to the rear in the communication port 65. The first pump 32 is arranged on the rear side of the center plate 66 in the inside annular flow channel 71.

The first assist nozzle 34 is arranged facing rearward on the front side of the division straightening vane 72. The second assist nozzle 35 is arranged facing rearward on the inner side of the left side straightening vane 60 in the inside annular flow channel 71. Here, the third assist nozzle 36 is connected to the sixth pipe 24 and arranged facing forward at a corner portion on the right side of a rear portion of the outside annular flow channel 70. A fourth assist nozzle 37 connected to the fourth pipe 22 is arranged facing forward on the right side of the center plate 66 in the inside annular flow channel 71.

In the cutting fluid circulation device 1B configured as described above, the cutting fluid collected from the machine tool by the conveyor 11 passes through the drum filter 4 to be filtered and then flows into the outside annular flow channel 70 and the inside annular flow channel 71 from the front and rear outlets 13, 13.

Then, when the pumping-up pump 5 is activated, the cutting fluid in the outside annular flow channel 70 is pumped up and supplied to the first pipe 15 and the second pipe 16. The cutting fluid flowing through the first pipe 15 is ejected inside the drum filter 4 from the cleaning nozzle to clean the drum filter 4 and then returned to the outside annular flow channel 70 and the inside annular flow channel 71 from the front and rear outlets 13, 13.

Additionally, a part of the cutting fluid branched from the first pipe 15 to each sixth pipe 24 is ejected from the first to third assist nozzles 34 to 36 into the first tank reservoir 2B. The cutting fluid ejected from the first assist nozzle 34 biases the flows in the outer divided flow channel 73 and the inner divided flow channel 74 to the rear side.

The cutting fluid ejected from the third assist nozzle 36 biases the flow at the rear portion of the outside annular flow channel 70 to the front side. Accordingly, a counterclockwise circulation flow is generated in the outside annular flow channel 70.

Meanwhile, in the inside annular flow channel 71, the cutting fluid discharged from the outlet 13 on the front side of the drum filter 4 along the right side straightening vane 61 to the front side generates a counterclockwise circulation flow. Since the inside annular flow channel 71 is communicated with the outside annular flow channel 70 via the communication port 65, a part of the flow at a right portion of the outside annular flow channel 70 joins up with the inside annular flow channel 71 from the communication port 65, thereby assisting the flow.

In addition, the cutting fluid ejected from the second assist nozzle 35 biases the flow at a left portion of the inside annular flow channel 71 to the rear side.

The cutting fluid flowing through the second pipe 16 is further filtered by the secondary filter 6 and fed to the third pipe 17. At this time, when the cutting fluid is not ejected from a tool mounted to a spindle in the machine tool, the first valve 20 is turned ON, that is, the valve is opened, and the second valve 21 is turned OFF, that is, the valve is closed, in the pipe switching unit 7. Accordingly, the cutting fluid supplied from the third pipe 17 passes through the first branch pipe 18, travels through the fourth pipe 22, and is returned from the fourth assist nozzle 37 to the first tank reservoir 2B. The cutting fluid ejected from the fourth assist nozzle 37 biases the flow at a right portion of the inside annular flow channel 71 to the front side. Accordingly, the flow in the inside annular flow channel 71 is assisted.

By thus activating the pumping-up pump 5, the cutting fluid is fed to each of the drum filter 4 and the secondary filter 6 to simultaneously perform cleaning of the drum filter 4 and filtration by the secondary filter 6, and the circulation flows in the outside annular flow channel 70 and the inside annular flow channel 71 are maintained. Accordingly, the flow in one direction can be formed while keeping a flow rate at a certain level or more, allowing avoidance of retention and accumulation of sludge inside the first tank reservoir 2B.

When machining is performed with the machine tool, the first pump 32 is activated to pump up the cutting fluid in the inside annular flow channel 71 and supply the cutting fluid into a work chamber. At this time, when the cutting fluid is ejected from the tool mounted to the spindle in the machine tool, the first valve 20 is turned OFF, that is, the valve is closed, and the second valve 21 is turned ON, that is, the valve is opened, in the pipe switching unit 7. Accordingly, the cutting fluid supplied from the third pipe 17 passes through the second branch pipe 19, travels through the fifth pipe 23, and is fed to the tertiary filter 8. The cutting fluid further filtered by the tertiary filter 8 is discharged into the second tank reservoir 3 and pumped up by the through pump 9 to be fed to the spindle. The cutting fluid overflowing from the second tank reservoir 3 crosses over the outer wall 12 and flows into the adjacent first tank reservoir 2B.

Thus, the cutting fluid circulation device 1B of Embodiment 3 described above also includes the first tank reservoir 2B as one example of a tank reservoir, the drum filter 4, and the pumping-up pump 5 as one example of a pump. The first tank reservoir 2B stores cutting fluid discharged from a machine tool. The drum filter 4 is disposed in the first tank reservoir 2B and filters the cutting fluid. The pumping-up pump 5 pumps up the cutting fluid in the first tank reservoir 2B. In the first tank reservoir 2B, the outside annular flow channel 70 as one example of an annular flow channel in which the cutting fluid filtered by the drum filter 4 circulates is formed.

Then, a part of the cutting fluid pumped up from the pumping-up pump 5 is fed to the drum filter 4, used for cleaning the drum filter 4, and then returned to the outside annular flow channel 70. Meanwhile, the part of the remaining cutting fluid is fed to the secondary filter 6 disposed outside the first tank reservoir 2B, filtered by the secondary filter 6, and then returned to the outside annular flow channel 70.

With the configuration, by activating only one pumping-up pump 5 in the simple outside annular flow channel 70, cleaning of the drum filter 4 and filtration by the secondary filter 6 can be simultaneously performed. Accordingly, the simple configuration can ensure cost reduction while maintaining collection performance of sludge by the drum filter 4 and the secondary filter 6, and similar effects to those of the cutting fluid circulation device 1 of Embodiment 1 can be obtained.

In Embodiment 3, the position of the pumping-up pump can be changed as necessary. The number and positions of the pumps other than the pumping-up pump can also be changed as necessary. A second pump may be arranged in the outside annular flow channel or the inside annular flow channel.

The number and positions of the assist nozzles and the pipes connected to the assist nozzles can also be changed as necessary. A plurality of assist nozzles may be arranged in the inner divided flow channel. However, the assist nozzles may be omitted as long as the circulation flow in the annular flow channel is possible.

The shape in plan view of the first tank reservoir may also be changed as necessary. The shape in plan view may be a rectangular shape with the right-left direction being longitudinal instead of the front-rear direction. The shape in plan view may be a square shape, polygonal shape, circular shape, or the like. The communication port between the outside annular flow channel and the inside annular flow channel may be provided at a different position from the above embodiment.

The conveyor may be arranged on the front side of the first tank reservoir instead of the rear side.

The following describes modification examples in common between the respective embodiments.

Filters other than those of the above embodiments can be used for the respective filters. The drum filter is not limited to a type built into a conveyor.

The second tank reservoir can be omitted. In this case, the pipe switching unit and the tertiary filter are also omitted, and the cutting fluid is returned from the third pipe to the first tank reservoir.

The temperature regulator of Embodiment 2 may also be disposed in the first tank reservoirs of Embodiments 1 and 3 to be used for assisting the flow of the cutting fluid. However, the temperature regulator can be omitted.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A cutting fluid circulation device comprising:
- a tank reservoir that stores cutting fluid discharged from a machine tool;
- a drum filter disposed in the tank reservoir, the drum filter as a primary filter that filters cutting fluid;
- a secondary filter disposed outside the tank reservoir;
- a pump that pumps up cutting fluid in the tank reservoir,
- an annular flow channel formed in the tank reservoir, the annular flow channel being configured to circulate the cutting fluid filtered by the drum filter;
- a first pipe configured to supply a part of the cutting fluid pumped up by the pump to the drum filter; and
- a second pipe configured to supply a remaining part of the cutting fluid pumped up by the pump to the secondary filter,
- wherein the first pipe is configured such that cutting fluid supplied to the drum filter is used for cleaning the drum filter and is then returned to the annular flow channel, and
- the second pipe is configured such that cutting fluid supplied to the secondary filter is filtered by the secondary filter and is then returned to the annular flow channel.

2. The cutting fluid circulation device according to claim 1, wherein
- a sixth pipe branched from the first pipe is provided in a flow channel between the pump and the drum filter or the secondary filter,
- a return flow channel is disposed between the secondary filter and the tank reservoir, and
- an assist nozzle is disposed in the tank reservoir, wherein
  - the sixth pipe is configured to return a part of the cutting fluid directly to the annular flow channel without being fed to the drum filter or the secondary filter,
  - the return flow channel is configured to return the cutting fluid filtered by the secondary filter to the annular flow channel, and
  - the assist nozzle ejects the cutting fluid to be returned to the annular flow channel via the sixth pipe and/or the return flow channel in a direction to assist a circulation flow in the annular flow channel.

3. The cutting fluid circulation device according to claim 2, wherein
- a straightening vane is disposed in the tank reservoir, the straightening vane straightening the circulation flow in the annular flow channel.

4. The cutting fluid circulation device according to claim 1, further comprising a conveyor installed in the tank reservoir, the conveyor collecting sludge from the cutting fluid discharged from the machine tool, wherein the drum filter is installed at a lower portion of the conveyor, and the annular flow channel is formed around the conveyor.

5. The cutting fluid circulation device according to claim 1, further comprising a second tank reservoir installed adjacently to the tank reservoir, wherein the cutting fluid filtered by the secondary filter is selectively suppliable via a return flow channel switching unit to any one of a first return flow channel and a second return flow channel, the first return flow channel causes the cutting fluid to return to the annular flow channel, and the second return flow channel causes the cutting fluid to return to the second tank reservoir after filtration by a tertiary filter.

* * * * *